United States Patent [19]

Tsuru et al.

[11] Patent Number: 5,530,919
[45] Date of Patent: Jun. 25, 1996

[54] MOBILE COMMUNICATOR WITH MEANS FOR ATTENUATING TRANSMITTED OUTPUT TOWARD THE USER

[75] Inventors: Teruhisa Tsuru; Harufumi Mandai, both of Nagaokakyo, Japan

[73] Assignee: Murata Manufacturing Co., Ltd., Japan

[21] Appl. No.: 239,022

[22] Filed: May 6, 1994

[30] Foreign Application Priority Data

Oct. 12, 1993 [JP] Japan .................. 5-254298
Mar. 1, 1994 [JP] Japan .................. 6-031523

[51] Int. Cl.⁶ .................................. H04B 1/38
[52] U.S. Cl. .................. 455/90; 455/89; 455/128; 455/129
[58] Field of Search .................. 455/89, 90, 128, 455/129, 300, 301; 361/800, 816, 818; 343/700 MS, 702, 841, 899

[56] References Cited

U.S. PATENT DOCUMENTS

| | | | |
|---|---|---|---|
| 4,899,164 | 2/1990 | McGrath | 343/700 |
| 5,150,282 | 9/1992 | Tomura et al. | 455/300 |
| 5,153,600 | 10/1992 | Metzler et al. | 343/700 |
| 5,170,173 | 12/1992 | Krenz et al. | 343/702 |
| 5,335,366 | 8/1994 | Daniels | 379/59 |
| 5,392,461 | 2/1995 | Yokoyama | 455/90 |

FOREIGN PATENT DOCUMENTS 0214806 3/1987 European Pat. Off. .

OTHER PUBLICATIONS

Patent Abstracts Of Japan, vol. 16, No. 570 (E–1297) 10 Dec. 1992 & Jp–A–04 220 851 (Mitsubishi) 11 Aug. 1992, (Abstract).
European Search Report dated Jan. 24, 1995.
The Sharper Image Catalog, Jun. 1994, pp. 22.
Microstrip Antennas, I. J. Bahl and P. Bhartia, 1980, pp. 26–29.
Small Antennas, K. Fujimoto et al., 1987, pp. 116–119, 147, 197–199.

*Primary Examiner*—Reinhard J. Eisenzopf
*Assistant Examiner*—Marsha D. Banks-Harold
*Attorney, Agent, or Firm*—Ostrolenk, Faber, Gerb & Soffen

[57] ABSTRACT

Disclosed herein is a mobile communicator comprising an antenna (3) built in a portable telephone body (1), and a circuit board (2) built in the communicator body (1) and provided with a ground electrode pattern (2a) arranged between an outer surface part (1a), which is brought into contact with or near a portion of a human head, and the antenna (3). A transmission output of the antenna (3) toward the human head is attenuated by the ground electrode pattern (2a) of the circuit board (2).

18 Claims, 8 Drawing Sheets

MOBILE COMMUNICATOR WITH MEANS FOR ATTENUATING TRANSMITTED OUTPUT TOWARD THE USER

BACKGROUND OF THE INVENTION

1. Field of the Invention

The present invention relates to a mobile communicator, and more particularly, it relates to an improvement in a mobile communicator having a built-in antenna.

2. Description of the Background Art

Figure 1:
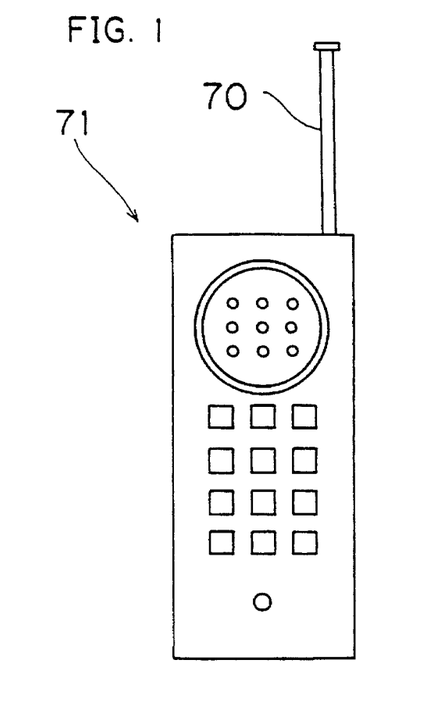
FIG. 1 is a front elevational view showing an exemplary conventional portable telephone.

FIG. 1 shows a portable telephone 71 which is an example of a conventional mobile communicator. An omnidirectional whip antenna 70 is mounted to project from an upper portion of the portable telephone 71, for transmitting electric waves.

Figure 2:
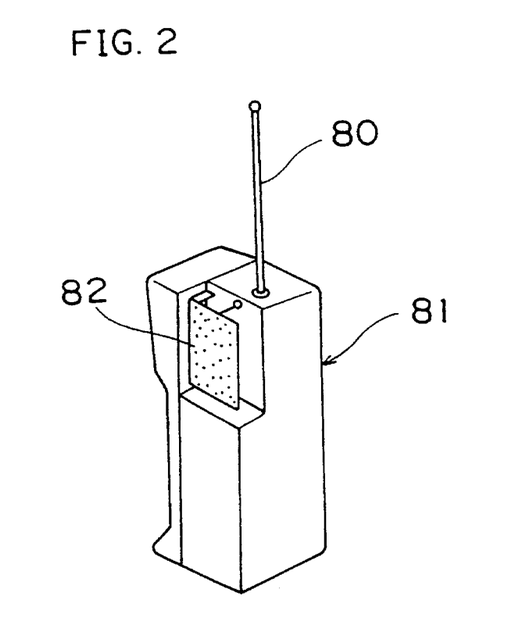
FIG. 2 is a partially broken away perspective view showing another exemplary conventional portable telephone.

FIG. 2 shows another exemplary conventional portable telephone 81 which is known in the art. An omnidirectional whip antenna 80 is mounted on an upper portion of this portable telephone 81, while a plate-type inverted-F antenna 82 is mounted in the interior of the portable telephone 81. The whip antenna 80 is adapted to transmit electric waves while the inverted-F antenna 82 is adapted to receive electric waves, so that a diversity unit is formed by the whip antenna 80 and the inverted-F antenna 82.

In relation to the aforementioned conventional mobile communicators, however, it has recently been pointed out that the electric waves transmitted by the omnidirectional whip antennas 70 and 80 are also radiated toward a portion of the human head, which is believed by some to exert an undersirable influence on the human body.

SUMMARY OF THE INVENTION

The present invention has been proposed in order to solve such a problem of the prior art, and an object thereof is to provide a mobile communicator which can reduce any influence exerted on a human body by transmitted electric waves.

According to a broad aspect of the present invention, provided is a mobile communicator comprising a communicator body having an outer surface part which is brought into contact with or close to a human head portion, an antenna which is built into the communicator body, and an attenuating means which is arranged between the outer surface part of the communicator body brought into contact with or close to the human head portion and the antenna for attenuating a transmission output from the antenna toward the human head portion.

The expression "between the outer surface part and the antenna" also includes the outer surface part itself.

According to the present invention, it is possible to reduce the strength of electromagnetic waves which are radiated toward the human body in transmission, due to the means provided between the outer surface part being brought into contact with or near the human head portion and the antenna built into the communicator. Thus, it is possible to reduce any influence which may be exerted on the human body by the electromagnetic waves radiated from the antenna.

The means for attenuating the transmission output from the antenna toward the human head portion can be formed by a circuit board which is arranged between the antenna and the outer surface part of the communicator body brought into contact with or near the human head portion and provided with a ground electrode pattern. Namely, it is possible to effectively suppress propagation of the electromagnetic waves radiated from the antenna toward the human head portion by connecting the ground electrode pattern to a reference potential such as a ground potential, for example.

Preferably, the antenna is surface-mounted on a surface of the circuit board which is opposite to that close to the human head portion, thereby miniaturizing the mobile communicator.

According to a specific aspect of the present invention, the mobile communicator comprises a second antenna for receiving, which is mounted on the communicator body to outwardly project from the communicator body, in addition to the built-in antenna, and the built-in antenna is utilized as a transmission antenna, thereby forming a diversity unit. According to this structure, the means for attenuating the transmission output toward the human head portion is arranged between the antenna and the human body in a radiation path of the electric waves transmitted from the built-in antenna, whereby it is possible to attenuate the transmission output toward the human head portion, i.e., to attenuate electromagnetic waves which are transmitted toward the human head portion. In receiving, on the other hand, electromagnetic waves are received by the second antenna, and hence receiving sensitivity can be easily improved by devising the second antenna appropriately.

According to another specific aspect of the present invention, the built-in antenna comprises a dielectric substrate, a ground electrode which is formed on at least one of a side surface and a bottom surface of the dielectric substrate, a radiator of a material having low conductor loss which is fixed to the dielectric substrate so that its first major surface is opposed to that of the dielectric substrate, and a feed part which is provided on at least one of a side surface and a bottom surface of a laminate formed by the dielectric substrate and the radiator. Since the ground electrode is arranged on the side or bottom surface of the dielectric substrate and the feed part is arranged on the side or bottom surface of the laminate, the antenna can be easily surface-mounted on a printed circuit board or the like, with a major surface of the dielectric substrate, which is opposite to that provided with the radiator, serving as a mounting surface. Further, the radiator is made of a material having low conductor loss such as a metal plate, for example, whereby an electrical resistance component of the antenna is reduced and its heat capacity is increased. Thus, Joule loss is reduced and hence it is possible to improve the gain of the built-in antenna, thereby facilitating miniaturization of the communicator body.

In particular, a space of a prescribed thickness is more preferably provided between the dielectric substrate and the radiator, thereby effectively suppressing loss of radiated electric waves. Thus, it is possible to further effectively improve the gain of the antenna.

The foregoing and other objects, features, aspects and advantages of the present invention will become more apparent from the following detailed description of the present invention when taken in conjunction with the accompanying drawings.

DESCRIPTION OF PREFERRED EMBODIMENTS

Figure 3:
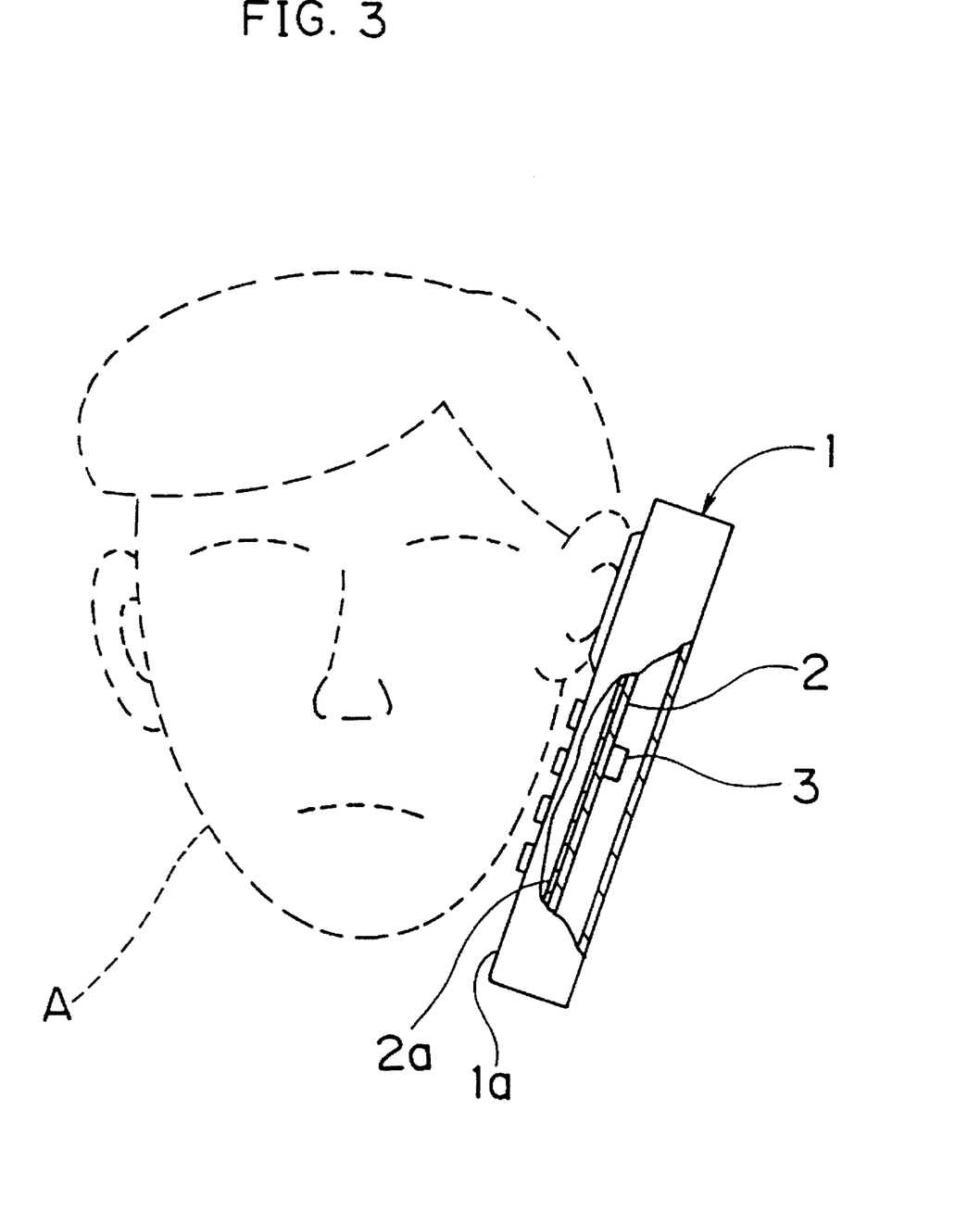
FIG. 3 is a partially fragmented front sectional view for illustrating a portable telephone according to a first embodiment of the present invention.

FIG. 3 is a partially fragmented front sectional view showing a state of employment of a mobile communicator according to a first embodiment of the present invention. The mobile communicator according to this embodiment is employed as a portable telephone.

Referring to FIG. 3, a portable telephone body 1 is formed by a case which is substantially in the form of a rectangular parallelepiped. One major surface of this portable telephone body 1 forms an outer surface part 1a which is brought close to a human head portion A schematically shown by broken lines.

A circuit board 2 is built in the portable telephone body 1. This circuit board 2 has a ground electrode pattern 2a. The ground electrode pattern 2a is formed on a major surface of the circuit board 2 which is closer to the human head portion A, to have a certain degree of area. The circuit board 2 is mounted in parallel with the outer surface part 1a, while an antenna 3 is mounted on another major surface of the circuit board 2 which is opposite to that close to the human head portion A.

In the portable telephone according to this embodiment, the ground electrode pattern 2a, which is connected to an earth potential, forms means for attenuating a transmission output of the antenna 3 toward the human head portion A.

In the portable telephone according to this embodiment, the ground electrode pattern 2a of the circuit board 2 is present between a radiation path of electric waves transmitted from the antenna 3 and the human head portion A, although the antenna 3 is omnidirectional. Therefore, the ground electrode pattern 2a shields the human head portion A from the electric waves transmitted toward the same, thereby attenuating the transmission output toward the human head portion A. Thus, any influence exerted on the human body by the transmitted electromagnetic waves is reduced.

The ground electrode pattern 2a, which forms means for attenuating the transmission output toward the human head portion A as hereinabove described, must be so formed as to have a certain degree of area exceeding a region overlapping with the antenna 3 through the circuit board 2, as described above. Preferably, the ground electrode pattern 2a is formed to substantially cover the overall major surface of the circuit board 2 which is closer to the human head portion A.

The circuit board 2 is not restricted to that provided with the ground electrode pattern 2a on its one major surface as shown in FIG. 3, but may be replaced by a multilayer circuit board which contains such a ground electrode pattern 2a. Further, the ground electrode pattern 2a may alternatively be formed on the major surface of the circuit board 2 on which the antenna 3 is mounted. Namely, the ground electrode pattern 2a can be formed in any arbitrary position so far as the same is interposed in the radiation path of the electric waves which are transmitted from the antenna 3 toward the human head portion A, so that the same can reduce the transmission output toward the human head portion A in any case.

The antenna 3 is properly formed by a miniature surface mounted type antenna which can be easily arranged in proximity to the ground electrode pattern 2a, in order to improve the electromagnetic shielding effect of the ground electrode pattern 2a. An example of such a surface mounted type antenna is now described with reference to FIGS. 4A and 4B.

Figure 4A:
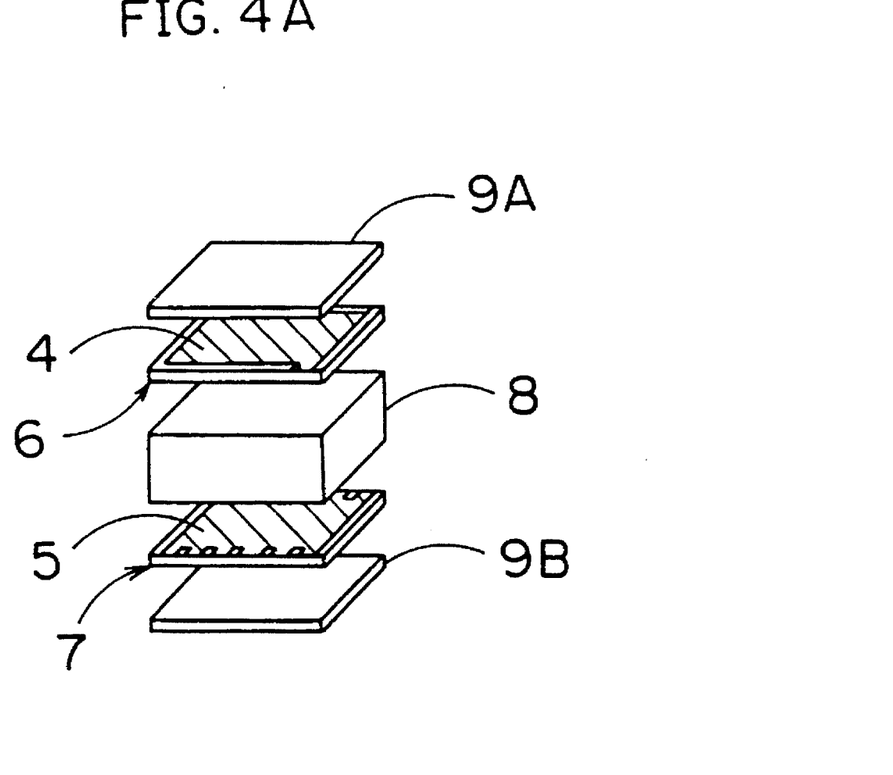
FIG. 4A is an exploded perspective view for illustrating an exemplary antenna which is employed for the first embodiment of the present invention.
Figure 4B:
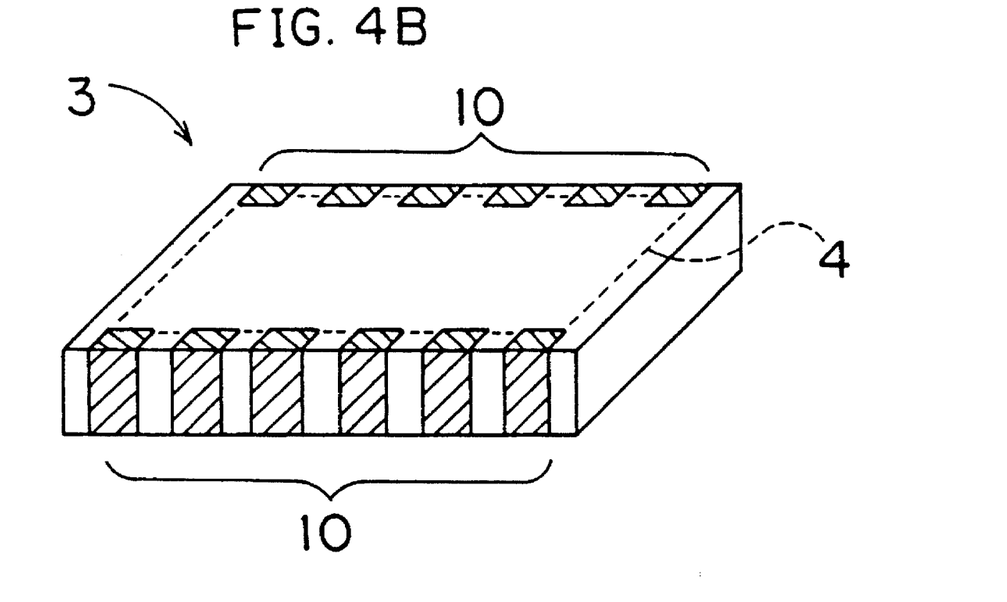
FIG. 4B is a perspective view of the antenna.
Figure 5:
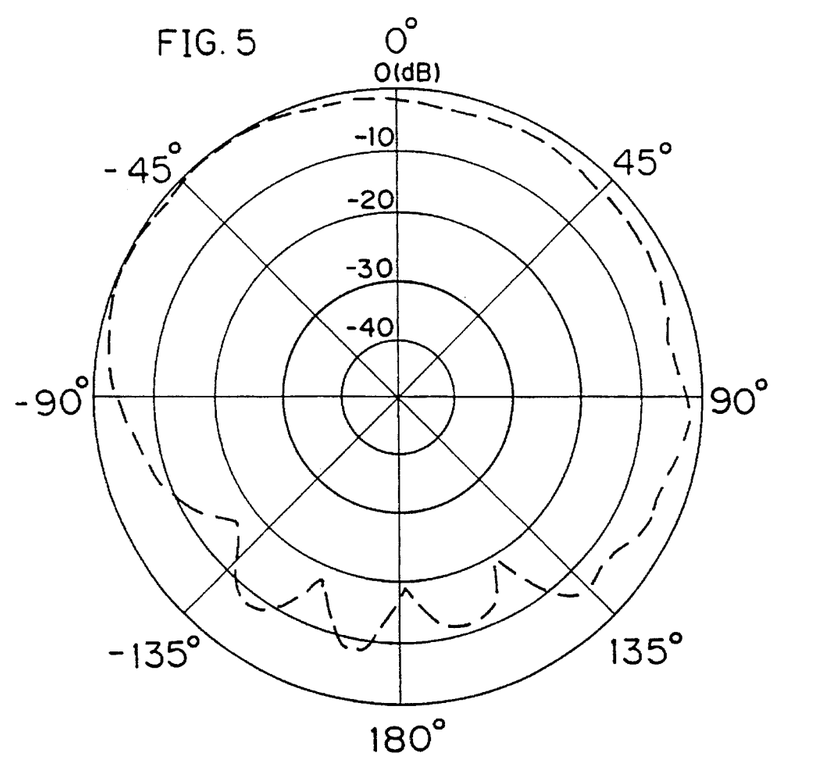
FIG. 5 illustrates a directional pattern of the antenna shown in FIG. 4B.

FIG. 4A is an exploded perspective view of an antenna 3, and FIG. 4B is a perspective view of the antenna 3. This antenna 3 is formed by stacking a dielectric substrate 6 provided with an antenna pattern 4 consisting of a conductive material, a dielectric substrate 7 provided with a shield pattern 5 consisting of a conductive material, a dummy substrate 8 provided with no electrode, and protective substrates 9A and 9B, and forming a plurality of external electrodes 10 on side surfaces of the laminate as formed. While this antenna 3 is normally omnidirectional, FIG. 5 shows a directional pattern of this antenna 3 when it is built in the aforementioned communicator body 1. Referring to FIG. 5, a line of −180° shows the direction of the human head portion A, as clearly understood from FIG. 3. Thus, it is clearly understood from the directional pattern shown in FIG. 5 that the output is attenuated by at least 10 dB in the direction of the human head portion A in the portable telephone according to this embodiment employing the aforementioned antenna 3. Thus, it is understood possible to reduce the transmission output to not more than 1/10 in the direction of the human head portion A.

Figure 6:
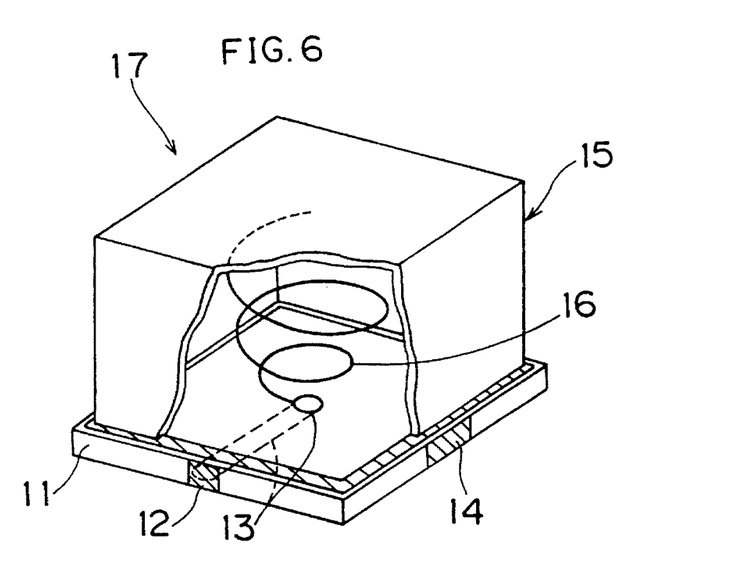
FIG. 6 is a partially fragmented perspective view for illustrating another exemplary antenna which is employed for the first embodiment of the present invention.

FIG. 6 is a partially fragmented perspective view showing another exemplary antenna 17 which is employable for the portable telephone according to the first embodiment of the present invention. The antenna 17 shown in FIG. 6 has a multilayer substrate 11 consisting of a dielectric substance or synthetic resin. An input/output electrode 12 is formed on a side surface of the multilayer substrate 11. This input/output electrode 12 is connected to a lead electrode 13 which is formed in the multilayer substrate 11 to reach its central portion. An external electrode 14 is formed on another side surface of the multilayer substrate 11 which is perpendicular to that provided with the input/output electrode 12. Further, a metal cap 15 forming a transmission/receiving part is mounted on an upper surface of the multilayer substrate 11, and a coil-shaped metal wire 16 is connected between the lead electrode 13 and the metal cap 15.

Figure 7:
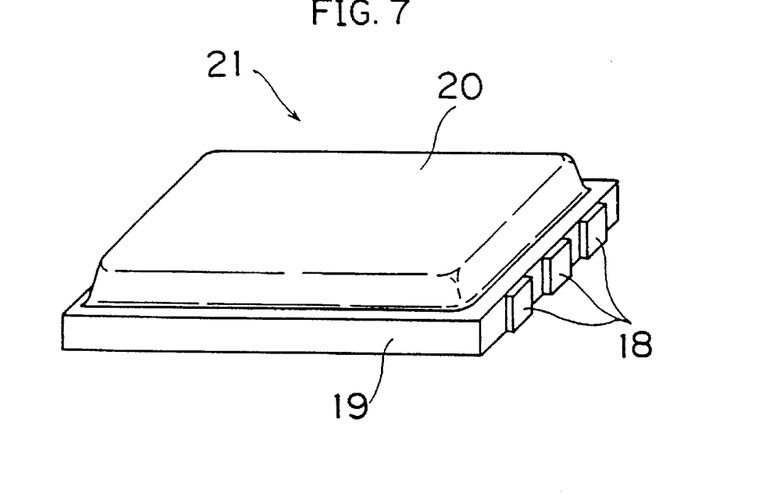
FIG. 7 is a perspective view showing still another exemplary antenna which is employed for the first embodiment of the present invention.

FIG. 7 is a perspective view showing still another exemplary antenna 21 which is employable for the portable telephone according to the first embodiment of the present invention. The antenna 21 shown in FIG. 7 is formed by combining a multilayer dielectric substrate 19 which is provided with a plurality of external electrodes 18 on its side surface and a metal cap 20 forming a transmission/receiving part with each other.

As clearly understood from the antennas 17 and 21 shown in FIGS. 6 and 7, the structure of the antenna which is employed for the portable telephone according to the first embodiment of the present invention is not particularly restricted. In the antennas 17 and 21, the transmission/receiving parts are formed by the metal caps 15 and 20 which are excellent in conductivity, whereby Joule loss is reduced and hence it is possible to improve the gains of the antennas 17 and 21.

Figure 8:
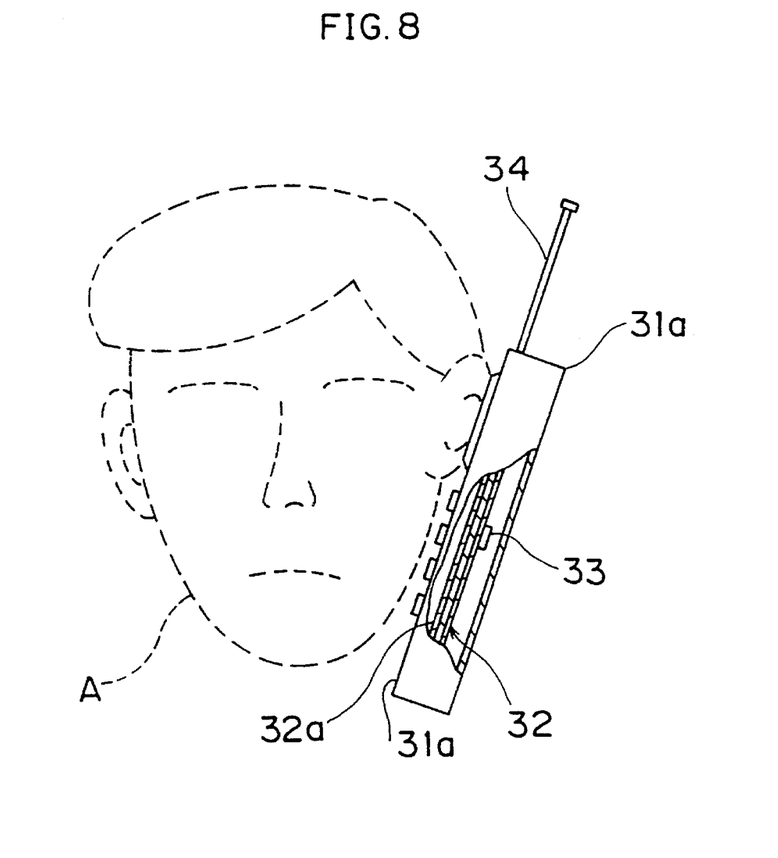
FIG. 8 is a partially fragmented front sectional view for illustrating a state of employment of a portable telephone according to a second embodiment of the present invention.

FIG. 8 is a partially fragmented front sectional view showing a state of employment of a mobile communicator according to a second embodiment of the present invention. The second embodiment is also applied to a portable telephone.

However, it is pointed out here that the present invention is also applicable to a mobile communicator other than a portable telephone, such as an on-vehicle mobile communicator, for example.

Referring to FIG. 8, the portable telephone according to this embodiment has a portable telephone body 31 having a case which is substantially in the form of a rectangular parallelepiped. One major surface of the portable telephone body 31 forms an outer surface part 31a which is on the side toward a human head portion A.

In the portable telephone body 31, a circuit board 32 is mounted in parallel with the outer surface part 31a, similarly to the first embodiment. A ground electrode pattern 32a is formed on one major surface of the circuit board 32, also similarly to the first embodiment. This ground electrode pattern 32a forms means for attenuating a transmission output of an antenna 33 described later toward the human head portion A, similarly to the first embodiment. The ground electrode pattern 32a is formed similarly to the ground electrode pattern 2a according to the first embodiment. This ground electrode pattern 32a may be built in the circuit board 32, or formed on a major surface of the circuit board 32 provided with the antenna The antenna 33 is mounted on the major surface of the circuit board 32 which is opposite to the outer surface part 31a. Further, a whip antenna 34 is mounted on an upper portion of the portable telephone body 31. The whip antenna 34, which forms a second antenna according to the present invention, outwardly extends from the upper portion of the portable telephone body 31.

In the portable telephone according to this embodiment, the aforementioned antenna 33 is employed as a transmission antenna, while the whip antenna 34 is employed as a receiving antenna. Namely, a diversity unit is formed by the antenna 33 and the second antenna 34.

The aforementioned ground electrode pattern 32a is interposed between the transmission antenna 33 and the human head portion A. Therefore, the ground electrode pattern 32a electromagnetically shields the human head portion A from electric waves which are transmitted from the antenna 33. Also in the portable telephone according to this embodiment, therefore, the transmission output toward the human head portion A is attenuated by the ground electrode pattern 32a, whereby it is possible to reduce any influence on the human body.

On the other hand, the second antenna 34 for receiving can be formed by a proper antenna having higher sensitivity which can attain excellent receiving performance with no substantial consideration of the aforementioned influence on the human body. Since the diversity unit is formed by the antenna 33 and the second antenna 34, it is possible not only to any influence on the human body exerted by electric waves in transmission but also to implement a portable telephone having high sensitivity and excellent receiving performance.

Antennas which are employable for the portable telephone according to the second embodiment of the present invention are now described with reference to FIGS. 9 to 12.

Figure 9:
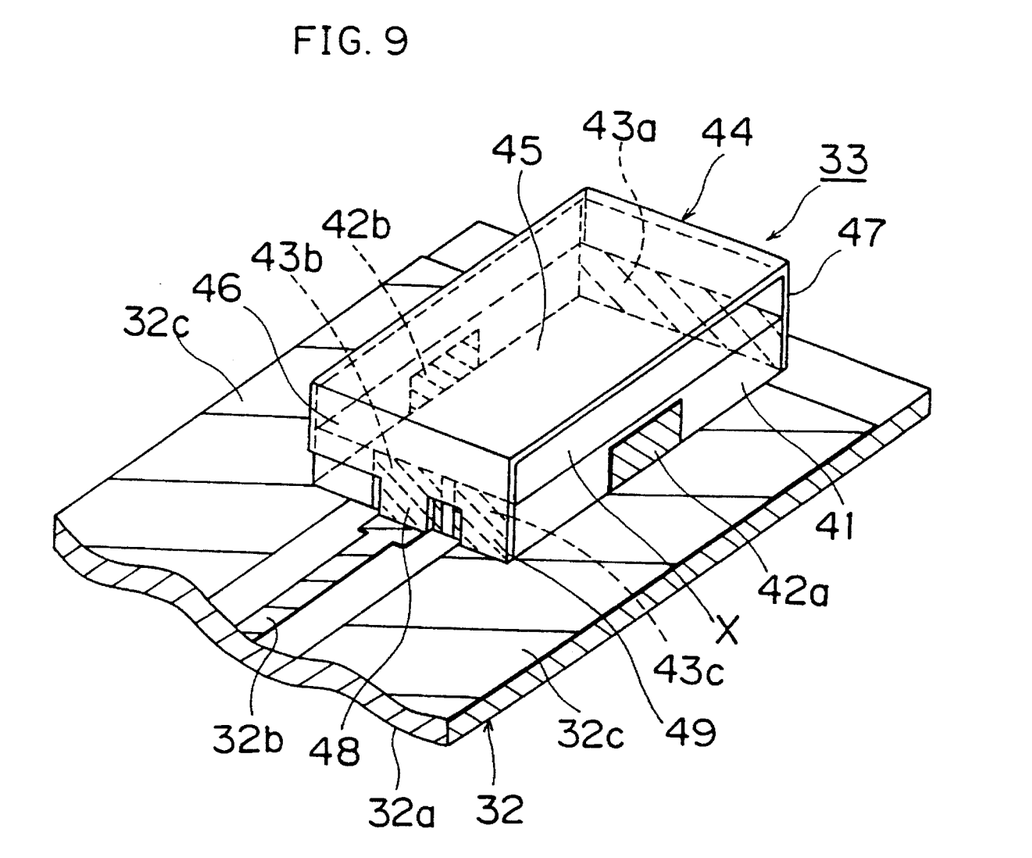
FIG. 9 is a partially fragmented perspective view for illustrating an exemplary built-in antenna which is employed for the second embodiment of the present invention.

FIG. 9 is a partially fragmented perspective view showing an antenna 33, employable as the built-in antenna 33 in the second embodiment, which is surface-mounted on a circuit board 32. Referring to FIG. 9, employed is a dielectric substrate 41 consisting of ceramics or synthetic resin, which is in the form of a rectangular parallelepiped. Ground electrodes 42a and 42b are formed on both longer side surfaces of the dielectric substrate 41. Further, connecting electrodes 43a to 43c are formed on both shorter side surfaces of the dielectric substrate 41. In addition, a radiator 44 consisting of a metal such as copper or a copper alloy, for example, is fixed to the dielectric substrate 41.

The radiator 44, which is made of a material having low conductor loss such as the aforementioned metal, is provided with a radiating part 45 having a rectangular plane shape, and two fixed parts 46 and 47 downwardly bent from both shorter ends of the radiating part 45. A feed terminal 48 and a ground terminal 49 are integrally formed on a forward end of the fixed part 46. The fixed part 46 is made smaller in length than the fixed part 47 so that the distance between the radiating part 45 and the forward ends of the feed terminal 48 and the ground terminal 49 is equal to that between the radiating part 45 and the forward end of the fixed part 47. Further, the lengths of the fixed parts 46 including the feed terminal 48 and the ground terminal 49 and the fixed part 47 are set to be larger as compared with the thickness of the dielectric substrate 41.

When the radiator 44 is so mounted on the dielectric substrate 41 that the forward ends of the feed terminal 48, the ground terminal 49 and the fixed part 47 are flush with the lower surface of the dielectric substrate 41, therefore, a space X of a prescribed thickness is defined between the radiating part 45 and the upper surface of the dielectric substrate 41.

The aforementioned antenna 33 is assembled by inserting the dielectric substrate 41 in the radiator 44 so that the shorter side surfaces of the dielectric substrate 41 are brought into contact with inner sides of the fixed parts 46 and 47 and soldered thereto. Namely, the connecting electrode 43a of the dielectric substrate 41 and the fixed part 47 of the radiator 44 as well as the connecting electrodes 43b and 43c provided on the dielectric substrate 41 and the feed and ground terminals 48 and 49 of the radiator 44 are bonded to each other by solder while defining the space X between the radiating part 45 and the upper surface of the dielectric substrate 41, thereby forming the antenna 33.

The antenna 33 is placed on the circuit board 32, and the ground electrodes 42a and 42b and the ground terminal 49 are soldered to a ground electrode pattern 32c which is formed on the circuit board 32 while the feed terminal 48 is soldered to a feeder 32b provided on the circuit board 32, so that the antenna 33 is surface-mounted on the circuit board 32.

In the printed circuit board 32, the aforementioned ground electrode pattern 32a is formed substantially over its lower surface.

Figure 10:
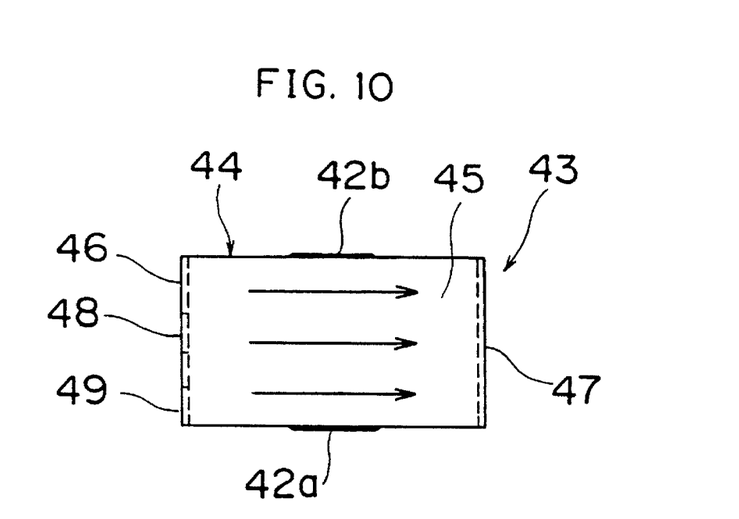
FIG. 10 is a plan view for illustrating the direction of a high-frequency current flowing in a metal chassis in the antenna shown in FIG. 9.

In the aforementioned antenna 33, a high-frequency current flowing in the radiating part 45 of the radiator 44 flows from the feed terminal 48 to a side surface which is opposed to that provided with the feed terminal 48, as shown by a schematic plan view in FIG. 10. A magnetic field is generated around the high-frequency current and an electric field is generated around the magnetic field, whereby the radiating part 45 radiates electric waves. Due to the space X defined between the radiating part 45 of the radiator 44 and the upper surface of the dielectric substrate 45, an eddy current generated on a ground plane by the magnetic field is so suppressed that the electric field hardly concentrates in the interior of the dielectric substrate 41. Thus, radiation efficiency for the electric waves is improved and the gain of the antenna 33 is improved, so that a sufficient gain can be ensured even when the antenna 33 is miniaturized.

Since the radiating part 45 for transmitting/receiving electric waves is made of a metal, an electric resistance component of the antenna 33 is reduced while its heat capacity is increased. Thus, Joule loss is so reduced that the gain of the antenna 33 is improved also by this.

The ground electrodes 42a and 42b, the feed terminal 48 and the ground terminal 49 are formed on the side surfaces so that the dielectric substrate 41 has a flat bottom surface, whereby the antenna 33 can be easily surface-mounted on the circuit board 32.

Figure 11:
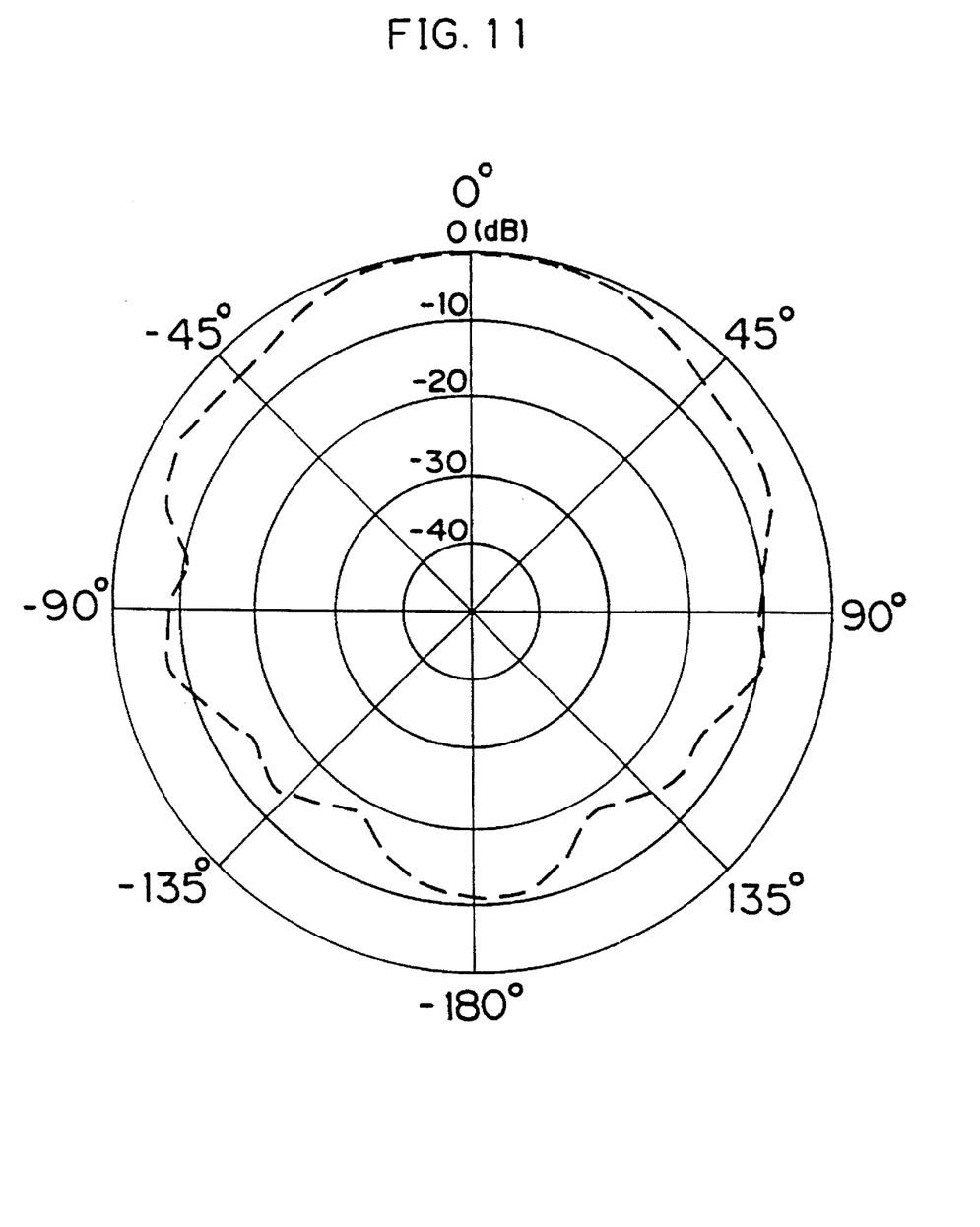
FIG. 11 illustrates a directional pattern of the antenna shown in FIG. 9.

A sample of the aforementioned antenna 33 was prepared to have a length of 10 mm, a width of 6.3 mm and a height of 4 mm with a resonance frequency of 1.9 GHz, and surface-mounted on the portable telephone according to the second embodiment of the present invention, to be subjected to measurement of its directional pattern. FIG. 11 shows the result. As shown in FIG. 11, this sample exhibited an excellent value of the maximum gain of −1 dB, and hence it is understood possible to attain a high gain in a miniature antenna. Further, the gain is attenuated by at least 10 dB in the −180° direction, i.e., the direction toward the human head portion A, and hence it is understood possible to reduce the transmission output toward the human head portion A to not more than 1/10.

Figure 12:
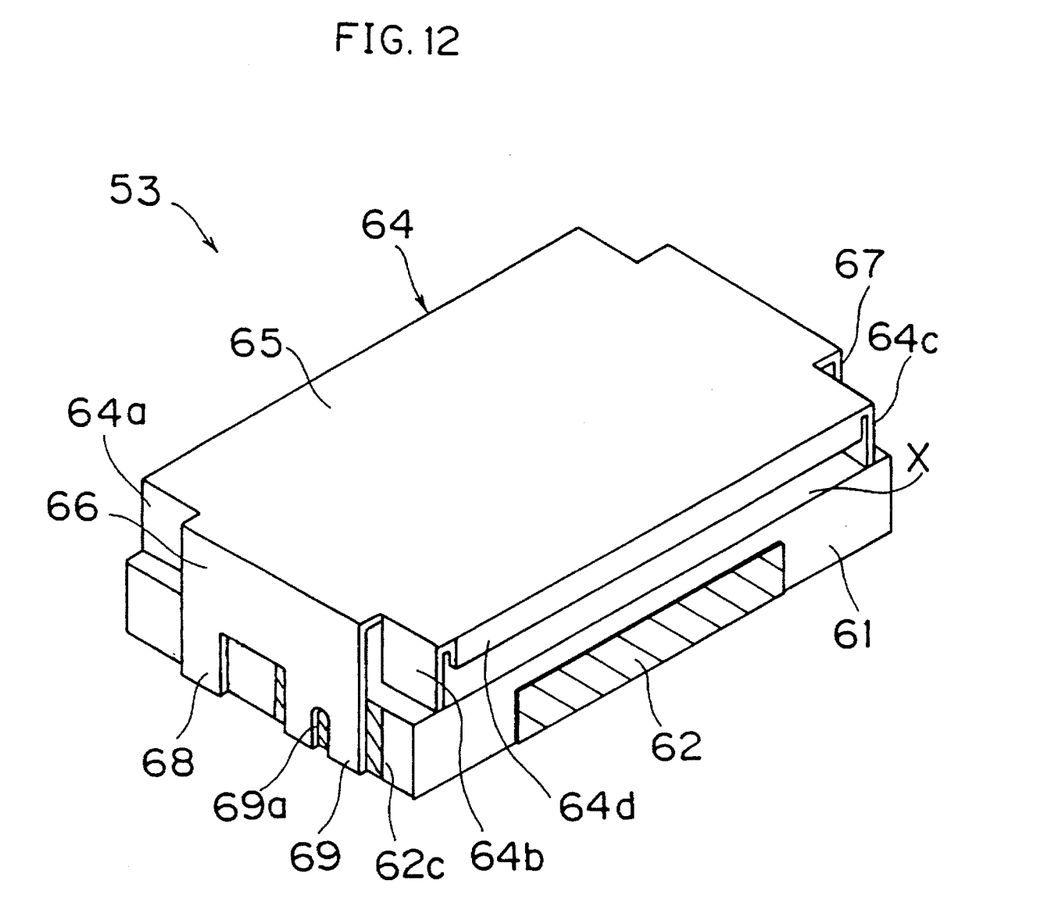
FIG. 12 is a perspective view for illustrating another exemplary antenna which is employed for the second embodiment of the present invention.

FIG. 12 is a perspective view for illustrating the structure of another antenna 53 which is employed in place of the aforementioned antenna 33. The antenna 53 shown in FIG. 12 has a dielectric substrate 61 consisting of synthetic resin or dielectric ceramics, and a radiator 64 consisting of a material having low conductor loss. The material having low conductor loss can be prepared from a metal such as copper or a copper alloy, similarly to that in the aforementioned antenna 33.

The dielectric substrate 61 is provided on its both longer side surfaces with ground electrodes 62 (FIG. 12 shows only the ground electrode 62 provided on one side surface). Further, connecting electrode 62c is formed on one shorter side surface. In addition, a single connecting electrode is formed on another shorter side surface (not shown). Namely, the dielectric substrate 61 is substantially similar in structure to the dielectric substrate 41 shown in FIG. 9.

This antenna 53 is different from the antenna 33 in the structure of the radiator 64. The radiator 64 is provided with a radiating part 65 having a rectangular plane shape. Shorter side edges of the radiating part 65 are downwardly bent to form first and second fixed parts 66 and 67. The fixed part 67 is bonded to the connecting electrode (not shown) which is formed on the shorter side surface of the dielectric substrate 61 by solder. A feed terminal 68 and a ground terminal 69 are integrally formed on a forward end of the fixed part 66. A slit 69a for serving as a solder injection part is formed in the ground terminal 69. This slit 69a is adapted to simplify injection of solder paste, so that the solder paste easily adheres to the connecting electrode 62c provided on the inner side. In more concrete terms, a solder discharge part of a dispenser is inserted in the slit 69a so that solder paste adheres to the connecting electrode 62c, and thereafter the solder paste is spread in a space between the ground terminal 69 and the connecting electrode 62c by heating, for enabling enlargement of the bonding area therebetween. The slit 69a may be replaced by a through hole which can receive the discharge part of the dispenser, thereby defining the solder injection part.

The feature of this embodiment resides in that stop members 64a to 64c are formed on both sides of the fixed parts 66 and 67, in order to form a space X of a prescribed thickness (the stop member provided on one side of the fixed part 67 is not shown in FIG. 12). Forward ends of the stop members 64a to 64c are brought into contact with the upper surface of the dielectric substrate 61, thereby deciding the thickness of the space layer X. Further, both longer side edges of the radiating part 65 are downwardly bent to form reinforcing members 64d for improving mechanical strength.

In the portable telephone according to the second embodiment of the present invention, it is also possible to employ the antenna 3, 17 or 21 which is employed for the portable telephone according to the first embodiment, in addition to the aforementioned antenna 33 or 53. On the other hand, it is also possible to apply the antenna 33 or 53, which is employed for the second embodiment, to the portable telephone according to the first embodiment. Namely, the structure of the built-in antenna is not restricted in particular according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A movable communicator comprising:

a communicator body having an outer surface part for being brought into contact with or close to a portion of a human head during use of said movable communicator;

a circuit board in said communicator body and an antenna mounted on a surface of said circuit board on a side thereof opposite to said outer surface part; and means arranged between said outer surface part of said communicator body and said antenna, for attenuating a transmission output of said antenna toward said human head portion, said means comprising a ground pattern on said circuit board between said antenna and said outer surface part.

2. A movable communicator in accordance with claim 1, wherein said antenna comprises a multilayer dielectric substance having an antenna pattern and a shield pattern.

3. A movable communicator in accordance with claim 1, wherein said antenna has a transmission/receiving part which includes a metal cap.

4. A movable communicator in accordance with claim 1, wherein said antenna comprises:

a dielectric substrate, a ground electrode on at least one of a side surface and a bottom surface of said dielectric substrate, a radiator comprised in a laminate together with said dielectric substrate, said radiator comprising a material having low conductor loss, said radiator being fixed to said dielectric substrate so that one major surface thereof is opposed to one major surface of said dielectric substrate, and a feed part on at least one of a side surface and a bottom surface of said laminate formed by said dielectric substrate and said radiator.

5. A movable communicator in accordance with claim 4, wherein said radiator comprises a radiating part having said one major surface, and at least one fixed part extending from at least one side edge of said radiating part toward said dielectric substrate, said at least one fixed part being fixed to said side surface of said dielectric substrate, thereby fixing said radiator to said dielectric substrate.

6. A movable communicator in accordance with claim 5, wherein said one major surface of said radiating part of said radiator is opposed to said one major surface of dielectric substrate through a space layer having a predetermined thickness.

7. A movable communicator in accordance with claim 6, wherein said antenna further comprises a feed terminal and a ground terminal integrally formed on a forward end of at least one of said fixed parts.

8. A movable communicator in accordance with claim 7, wherein a pair of stop members are arranged on sides of at least one said fixed part so that forward ends of said pair of stop members are brought into contact with said one major surface of said dielectric substrate, thereby determining said thickness of said space layer.

9. A movable communicator in accordance with claim 1, further comprising:

a second antenna for receiving, mounted on said communicator body so as to outwardly extend from said communicator body, wherein said antenna which is built in said communicator body is employed as a transmission antenna, whereby said transmission antenna, and said second antenna for receiving, together form a diversity unit.

10. A movable communicator in accordance with claim 9, wherein said means for attenuating said transmission output toward said human head portion is a circuit board having a ground pattern which is arranged between said antenna and said outer surface.

11. A movable communicator in accordance with claim 10, wherein said antenna is surface-mounted on a surface of said circuit board opposite to said outer surface part.

12. A movable communicator in accordance with claim 11, wherein said antenna comprises a multilayer dielectric substance having an antenna pattern and a shield pattern.

13. A movable communicator in accordance with claim 11, wherein said antenna has a transmission/receiving part which includes a metal cap.

14. A movable communicator in accordance with claim 9, wherein said antenna comprises:

a dielectric substrate, a ground electrode on at least one of a side surface and a bottom surface of said dielectric substrate, a radiator comprised in a laminate together with said dielectric substrate, said radiator comprising a material having low conductor loss, said radiator being fixed to said dielectric substrate so that one major surface thereof is opposed to one major surface of said dielectric substrate, and a feed part on at least one of a side surface and a bottom surface of said laminate formed by said dielectric substrate and said radiator.

15. A movable communicator in accordance with claim 14, wherein said radiator comprises a radiating part having said one major surface, and at least one fixed part extending from at least one side edge of said radiating part toward said dielectric substrate, said at least one fixed part being fixed to said side surface of said dielectric substrate, thereby fixing said radiator to said dielectric substrate.

16. A movable communicator in accordance with claim 15, wherein said one major surface of said radiating part of said radiator is opposed to said one major surface of dielectric substrate through a space layer having a predetermined thickness.

17. A movable communicator in accordance wit claim 16, wherein said antenna further comprises a feed terminal and a ground terminal integrally formed on a forward end of at least one of said fixed parts.

18. A movable communicator in accordance with claim 17, wherein a pair of stop members are arranged on sides of at least one said fixed part so that forward ends of said pair of stop members are brought into contact with said one major surface of said dielectric substrate, thereby determining said thickness of said space layer.

* * * * *